INVENTORS
ALBERTO Q. RIVAS
LAURENCE R. PARKER
TERRELL M. JONES
BY James F. Bryan
ATTORNEY July 29, 1969  A. Q. RIVAS ET AL  3,457,890
CONCRETE LIQUEFIED GAS VESSEL
Filed Oct. 23, 1967  4 Sheets-Sheet 2

INVENTORS
ALBERTO Q. RIVAS
LAURENCE R. PARKER
TERRELL M. JONES
BY
*James F. Bryan*
ATTORNEY July 29, 1969   A. Q. RIVAS ET AL   3,457,890
CONCRETE LIQUEFIED GAS VESSEL Filed Oct. 23, 1967   4 Sheets-Sheet 3

INVENTORS
ALBERTO Q. RIVAS
LAURENCE R. PARKER
TERRELL M. JONES
BY
*James F. Bryan*
ATTORNEY July 29, 1969  A. Q. RIVAS ET AL  3,457,890

CONCRETE LIQUEFIED GAS VESSEL

Filed Oct. 23, 1967  4 Sheets-Sheet 4

INVENTORS
ALBERTO Q. RIVAS
LAURENCE R. PARKER
TERRELL M. JONES

BY

*James J. Bryan*

ATTORNEY

United States Patent Office 3,457,890
Patented July 29, 1969

3,457,890
CONCRETE LIQUEFIED GAS VESSEL
Alberto Q. Rivas, New York, and Laurence R. Parker, Huntington, N.Y., and Terrell M. Jones, Parsippany, N.J., assignors to Esso Research and Engineering Company, a corporation of Delaware
Filed Oct. 23, 1967, Ser. No. 677,234
Int. Cl. B63b 25/14; B65d 25/14
U.S. Cl. 114—74                                    12 Claims

ABSTRACT OF THE DISCLOSURE

A tank constructed of pre-stressed concrete is adapted to hold cool and super-cool liquids of the type, for example, as liquefied petroleum and liquefied natural gas. Various forms of liquid-containing insulated concrete structures including panel arrangements are shown, especially as these would appear in the construction of a concrete tanker, barge, or other floating storage vessel for the transport of the aforementioned liquids.

---

It has heretofore been the practice in the construction of tankers for the transport of cryogenic liquids to construct vessels to have a double hull of conventional structural steel and to provide a thermal barrier between the structure of the ship and the cryogenic liquid. Conventional steels are subject to embrittlement at extremely low temperatures, thus necessitating somewhat complicated and expensive construction.

According to the present invention, a concrete tanker is disclosed having pre-stressed sections to provide structural strength to withstand dynamic forces at sea. The tanker is equipped with cargo compartments for the storage and containment of cool or super-cool liquids; for example, liquefied natural gas, ammonia, etc. The invention further provides for insulating the cargo carrying portions of the ship. Because of the nature of the basic construction, viz. the use of concrete, greater flexibility can be used in designing a tanker since concrete is not subject to destruction or embrittlement when subjected to extremes of cold. Therefore, in certain of the disclosed embodiments, portions of the concrete may come into direct contact with the cryogenic material or it may be permitted to feel the effects produced by partial insulation.

Further advantages will be seen from the relative ease with which a vessel may be constructed according to the principles of the present invention and from the inexpensiveness of such construction.

Attention is invited to the following description of different embodiments of the invention and of the accompanying drawings in which.

Figure 1:
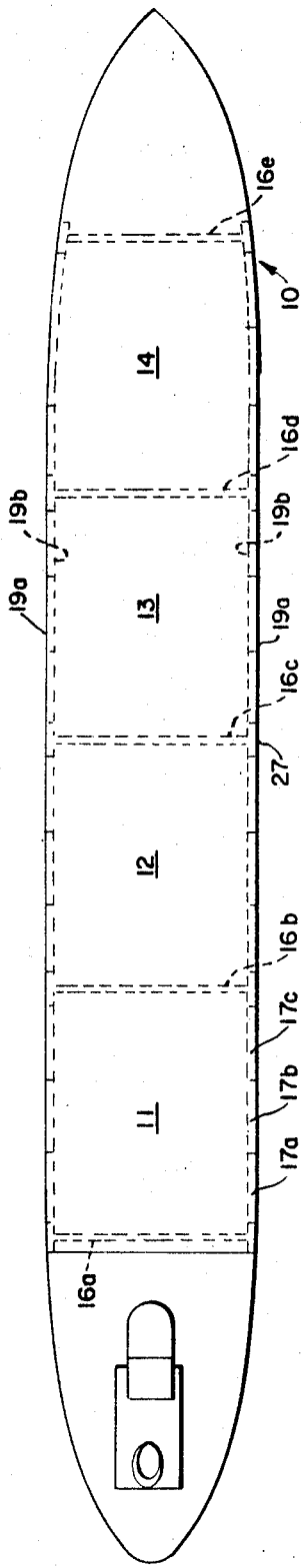
FIGURE 1 is a plan view of a prestressed concrete tanker constructed according to the invention.
Figure 2:
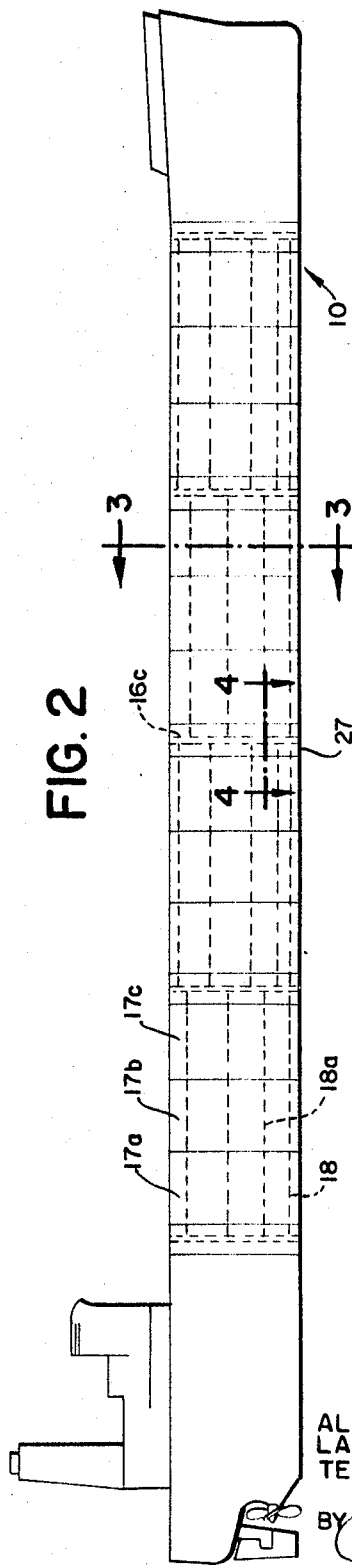
FIGURE 2 is a side elevation of said tanker.

Referring now to the drawings, there is shown in FIGURES 1 and 2 respectively, plan and elevation views of a tanker 10 having four cargo tanks 11 through 14. Separating the cargo tanks and at each end of the cargo section are cofferdams 16a through 16d. At least the cargo section of tanker 10 is constructed using prestressed concrete techniques and, accordingly, in one form of construction each cargo tank may comprise panels 17a through 17c. Horizontal prestressing of these panels will be accomplished by threading therethrough horizontal rods such as 18 and 18a, the ends of which appear in a portion of the exterior or hull wall adjacent each cofferdam 16a through 16e, as will be described in relation to FIGURES 4 and 7. The panels are also prestressed vertically, as will be described.

Figure 3:
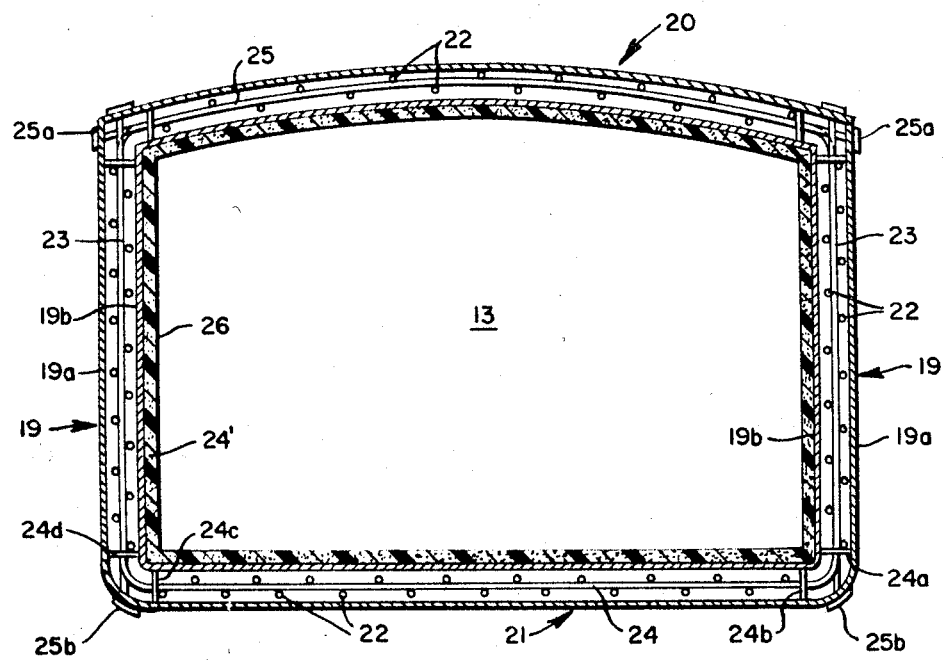
FIGURE 3 is a vertical transverse section taken along lines 3—3 of FIGURE 2 through a cargo compartment.

A vertical transverse cross section of the cargo tank 13 has been illustrated in FIGURE 3. It will be seen that tank 13 has prestressed concrete side walls 19 and top and bottom walls 20 and 21.

Figure 5:
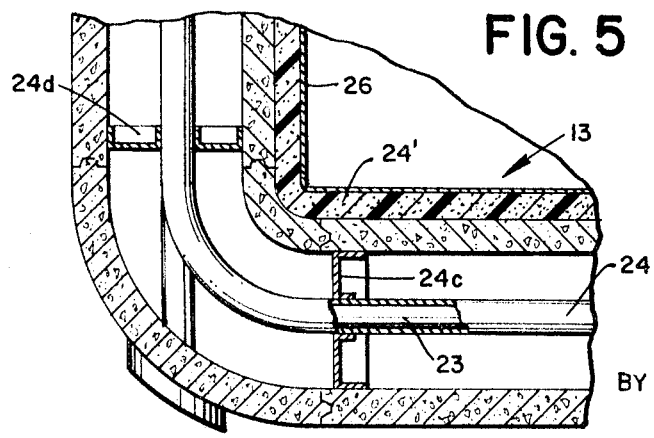
FIGURE 5 is an enlarged fragmentary cross section of a lower portion of the structure shown in FIGURE 3.
Figure 8A:
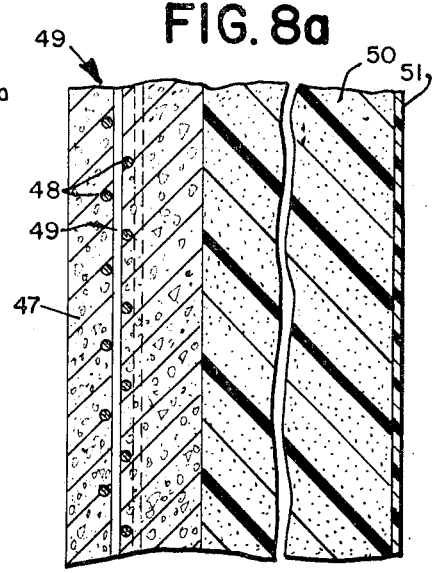
FIGURE 8a is a fragmentary cross section of another embodiment of the invention.
Figure 8B:
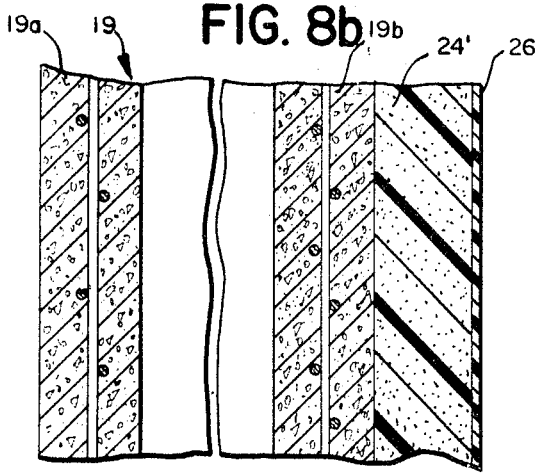
FIGURE 8b is an enlarged fragmentary cross section of the structure shown in FIGURE 3.

The enlarged fragmentary cross sections of FIGURES 5 and 8b correspond to the construction used in cargo tank 13. Each of the walls 19 consist of spaced concrete panels 19a, 19b, which may be, for example, individually four inches thick and sixteen inches apart. Such separation in combination with prestressing provides great structural strength. Prestressing is accomplished by means of horizontal tension rods 22 and tension rods 23 extending through the bottom and vertically through the sides.

The bottom 21 may be solid, or as shown of double-walled construction, prestressed by the horizontal portions of rods 23. As shown in FIGURE 5, rod 23 may, at least for the containment of the horizontal portion thereof and the bend at each side, be contained in a conduit 24 held by spacers 24a–24d.

The top 21 forms an arch, which construction assists in eliminating internal vertical support. The top is provided with tensioning rods 25 which extend from a termini, for example at 25a across the top and down the sides 19 to termini 25b.

As will be seen with reference to FIGURE 8b, a layer of insulation 24 is secured to the inner face of panel 19b. This insulation layer is faced inwardly with a suitable membrane 26 providing a barrier against the passage of liquid. The membrane 26 may be of plastic, metallic, or other suitable material. Both the layer 24 and the membrane 26 form continuous thermal and liquid barriers internally of the prestressed concrete wall, thereby preventing the transmission of cold and of liquid externally of the cargo tank 13.

Figure 4:
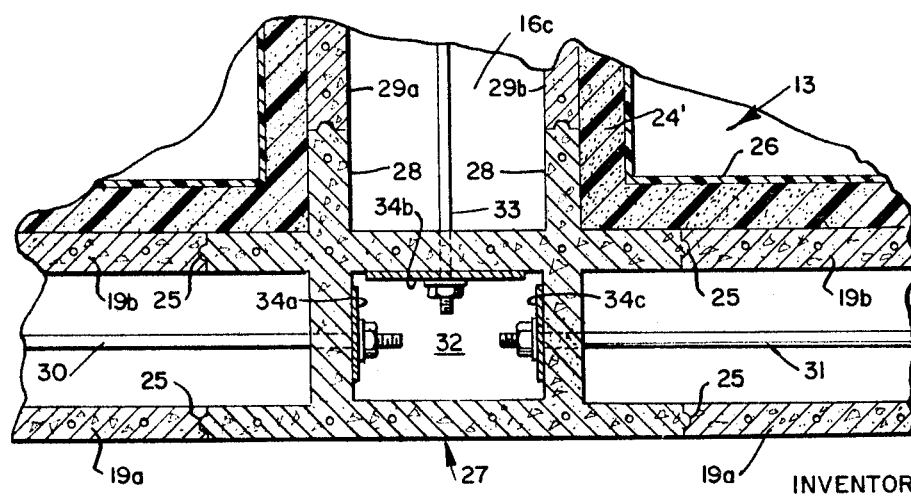
FIGURE 4 is a horizontal transverse section taken along lines 4—4 through a cofferdam and adjacent cargo compartments.

With respect to the first form of construction described above the cofferdam 16c has been illustrated in detail in FIGURE 4. Spaced concrete walls 19a and 19b have been identified in the figure and as shown the ends are fitted together at 25 to a box-like joint 27. Transverse legs of the joint 28 are fitted to spaced walls 29a and 29b, forming the cofferdam 16c. Longitudinal tensioning rods 30, 31 pass through opposite facing walls of the joint 27 to an interior well 32, which is sufficiently large for access in order to effect tensioning of the rods 30 and 31. Similarly, the transverse tensioning rods 33 through the cofferdam pass through the wall of the joint and into the well 32. Bearing plates 34a–c extend throughout the well 32 to permit the tensioning of rods 30, 31, and 33 to exert even compression against the respective sides of the joint 27.

Figure 6:
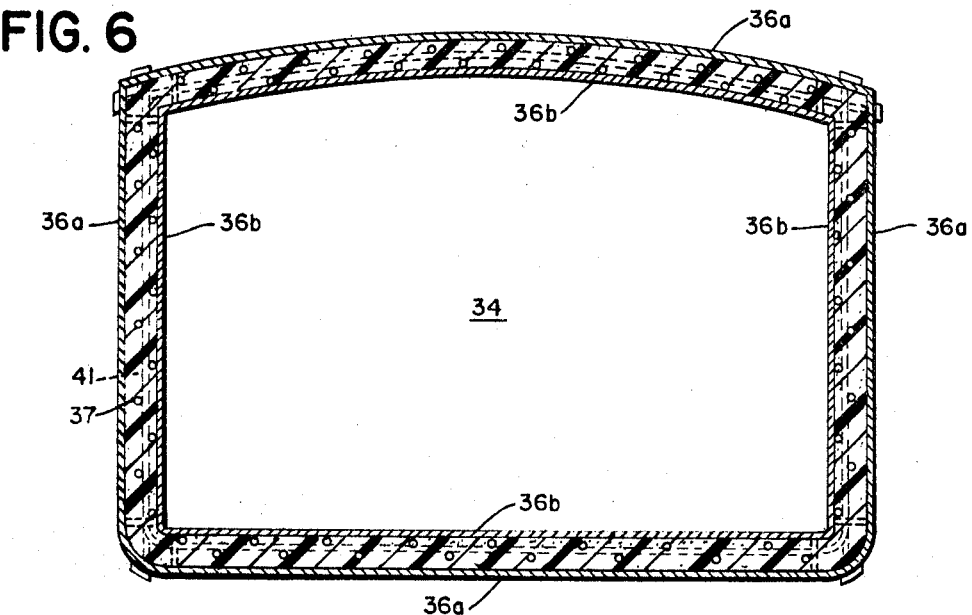
FIGURE 6 shows a transverse section of the vessel similar to that of FIGURE 3, using an alternate form of construction.
Figure 7:
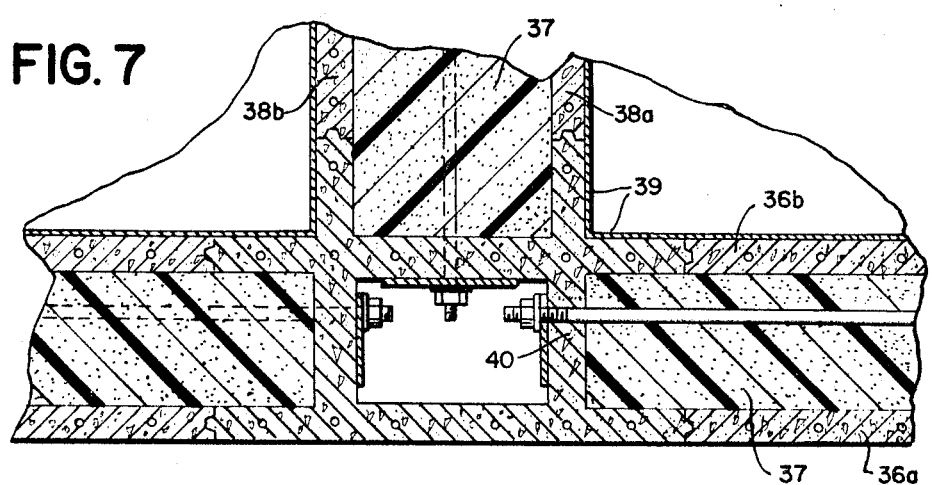
FIGURE 7 is a section similar to FIGURE 4 showing an alternate form of construction.
Figure 9A:
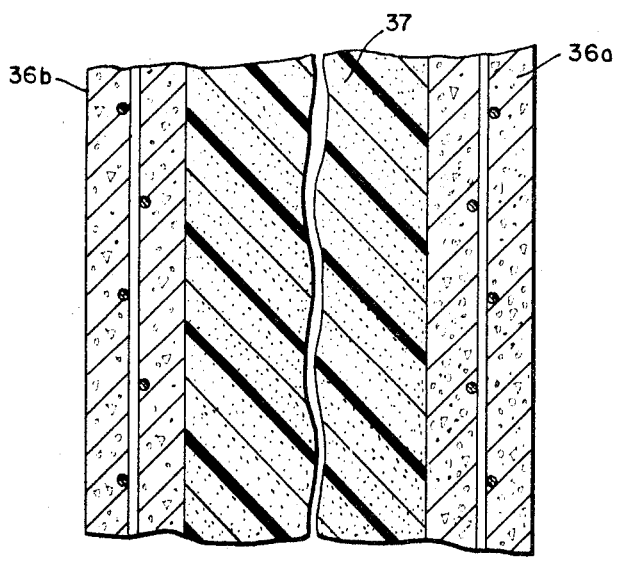
FIGURE 9a is an enlarged fragmentary cross section of the form of construction generally shown in FIGURE 7.

FIGURE 6 is a transverse cross section of the cargo tank 34 using an alternate form of construction. The construction shown comprises spaced concrete walls 36a, 36b which form, in this case, side walls, top and bottom walls. As seen in FIGURES 7 and 9a, insulation 37 is provided intermediate the respective walls 36a, 36b and intermediate walls 38a, 38b of the adjacent cofferdam. The membrane 39 seals the interior of the cargo-carrying portion. The membrane 39 has been omitted in the construction shown in FIGURE 9a to illustrate that in some instances the liquid contained will not normally permeate the inner wall 36b either due to the nature of the liquid or because of particular sealants employed in the fabrication of the concrete itself.

It will be observed that tensioning rods 40 and 41 have been shifted toward the inner wall 36b in order to exert a relatively greater prestressing upon the inner wall relative to the outer wall 36a. Such differential prestressing is desirable since the wall 36b will be subjected to cold temperatures whereas walls 36a are protected therefrom by the insulation 37. As a consequence, thermal shrinkage of wall 36b tending to "unload" prestressing will be minimized.

Figure 9B:
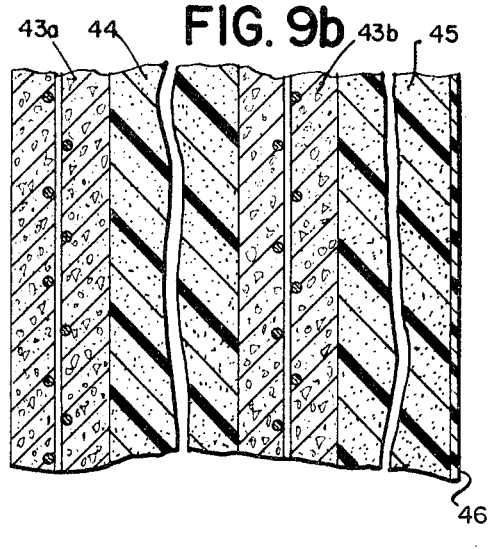
FIGURE 9b is a cross sectional view of yet another tanker wall construction.

FIGURE 9b shows a construction which is a variant of that just described with respect to FIGURES 6, 7 and 9a. Spaced concrete walls 43a, 43b are shown with an insulation layer 44 intermediate these walls, and a second insulation layer 45 adjacent to the inner face of wall 43b. A membrane 46 is a barrier against the passage of liquid. In this construction, wall 43b will be partially subjected to cold but not so directly as with respect to wall 36b of FIGURES 6 and 7. Consequently, whereas the construction of FIGURES 6 and 7 may be more suitable to the storage or containment of merely cool liquids such as liquefied petroleum gas, the construction of FIGURE 9b may be suitable to contain a cryogenic liquid such as liquefied natural gas. Both of the constructions shown respectively in FIGURES 6 or 9 and in FIGURE 9b have the advantage of utilizing the void between the spaced concrete walls, therefore utilizing space more efficiently.

With respect to the construction shown in FIGURE 8a, it may be desirable, for example, to construct a tanker or other storage container entirely of solid concrete as indicated by reference numeral 47. Prestressing is accomplished by the horizontal members 48 and vertical member 49. Insulation 50 is applied internally of wall 47 and facing the insulation is a membrane 51. It will be understood that panels may be made according to the construction shown in FIGURE 8a and fitted together using techniques described with respect to the two previous embodiments.

The foregoing description relates to the particular embodiments of the invention and is therefore merely representative.

What is claimed is:

1. A marine vessel for transporting or storing cool and supercool liquids and the like comprising a hull having a cargo section, said cargo section being characterized by walls fabricated particularly of concrete to form concrete exterior hull walls of said tanker and concrete interior transverse walls connecting said exterior hull walls to define the ends of at least one cargo tank, means for prestressing each of said walls biaxially, and insulation means in association with said walls as a thermal barrier against the transmission of cold externally of said hull.

2. A vessel according to claim 1 wherein said insulation is attached to interior faces of said walls and a liquid barrier membrane is attached to the inner surface of said insulation.

3. A vessel according to claim 1 wherein at least said walls forming the sides of said hull comprise relatively thin concrete sections spaced apart in parallel relationship to form a central void, said prestressing means is a plurality of vertically arranged horizontal rods and a plurality of rods disposed perpendicularly to said horizontal rods, said rods passing through said central void, said side wall sections forming panels having adjacent abutting edges and means for placing said rods in tension to prestress said walls.

4. A vessel according to claim 3 in which the ends of said cargo tank are defined by a cofferdam of the same general construction as said side walls, and an oblong, hollow joint is provided joining said side walls and cofferdam, said joint providing means including access space for tensioning said horizontal rods passing from said side walls and cofferdam.

5. A vessel according to claim 3 in which said insulation is attached to the inner surface of the inner wall section and a liquid barrier membrane is attached to the inner surface of said insulation.

6. A vessel according to claim 3 in which said insulation is located within said central void.

7. A vessel according to claim 6 in which a liquid barrier membrane is attached to the inner surface of said wall.

8. A vessel according to claim 7 in which the horizontal tensioning rods are disposed closer to the inner than to the outer wall sections.

9. A vessel according to claim 3 in which a layer of said insulation is attached to the inner surface of the inner wall section, a liquid barrier membrane is attached to the inner surface of said insulation and a layer of insulation is located within said central void.

10. A prismatic tank for the storage of cool and supercool liquids and the like having walls comprising relatively thin concrete sections spaced apart in parallel relationship to define a void therebetween, said sections being constructed as panels for assembly to form said tank, biaxially arranged tensioning rods passing substantially parallel to the plane of the panel sections and intermediate said sections and joining adjacent panels, and insulation means in association with said panels to prevent transmission of cold to the exterior of said tank.

11. The tank according to claim 10 in which said insulation is attached to the interior face of the inner concrete wall section and a liquid barrier membrane is attached to the inner face of said insulation.

12. The tank according to claim 10 wherein at least part of the insulation is located intermediate said concrete wall sections.

References Cited

UNITED STATES PATENTS

| | | |
|---|---|---|
| 1,643,329 | 9/1927 | Baribault. |
| 3,034,309 | 5/1962 | Muck. |
| 3,151,416 | 10/1964 | Eakin et al. |

TRYGVE M. BLIX, Primary Examiner

U.S. Cl. X.R.

220—9